United States Patent Office 3,297,047
Patented Jan. 10, 1967

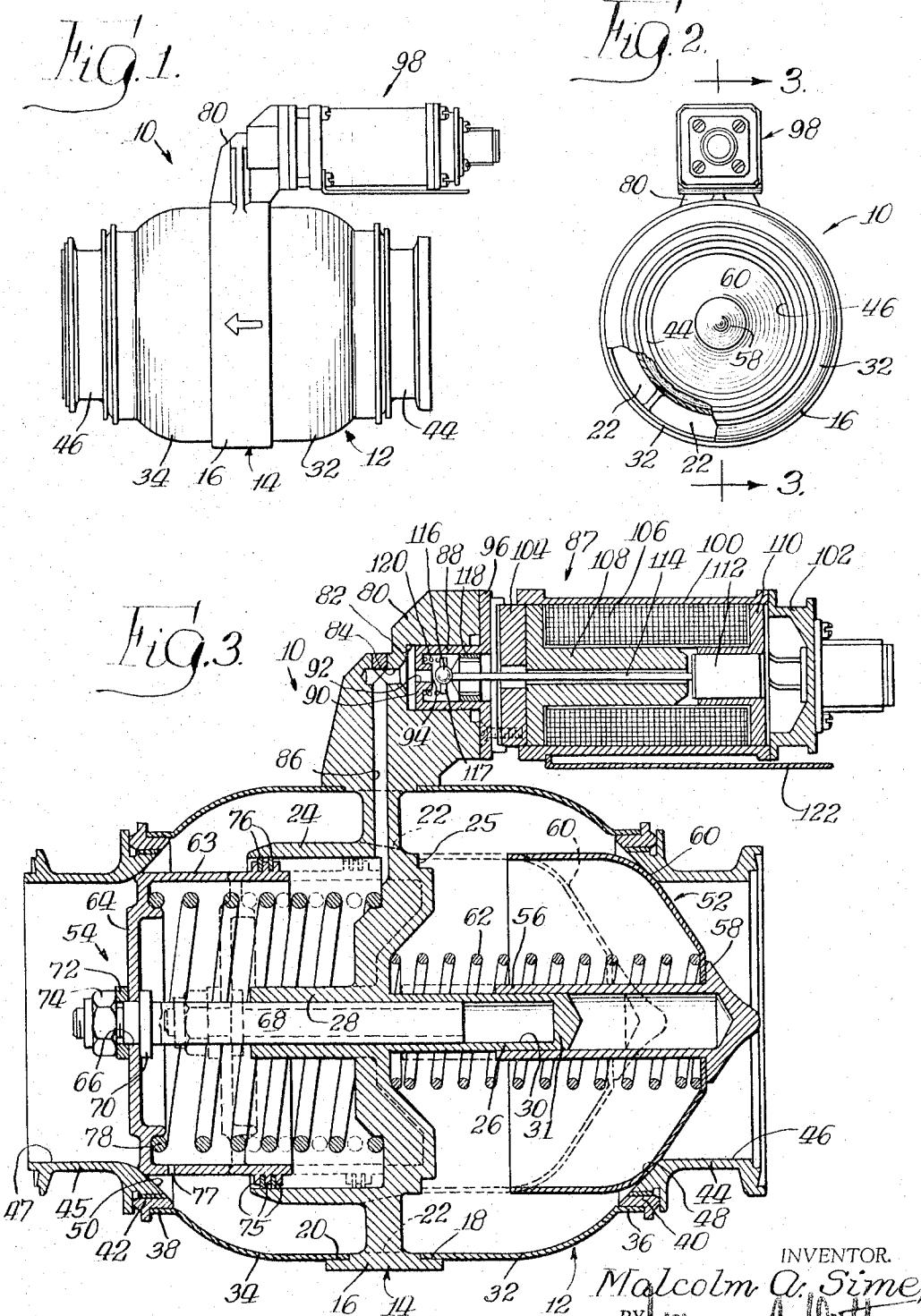

3,297,047
VALVE ASSEMBLY
Malcolm A. Sime, Des Plaines, Ill., assignor to Vapor Corporation, Chicago, Ill., a corporation of Delaware
Filed Mar. 17, 1964, Ser. No. 352,565
5 Claims. (Cl. 137—220)

My present invention relates generally to a valve assembly, and more particularly to a combined shut-off and check valve assembly.

In certain aircraft, the starting of an engine is effected by directing air from an external source, or from a previously started engine in a multi-engine aircraft, into the engine to be started. In connection with impingement starting, it is desirable to control the flow of fluid or air into the engine being started, and to prevent the flow of fluid or air from the engine after it has been started. It is also customary to use bleed air from aircraft engines in associated environmental control systems. With respect to such applications, it is desirable to control the flow of fluid or bleed air from the engine to the environmental control system, and to prevent the reverse flow of fluid or air from the control system to the engine.

It is a primary object of my present invention to provide valve means for controlling the flow of fluid therethrough in one direction in a normal flow mode and for automatically checking the flow of fluid therethrough in the opposite direction. The valve means of my present invention is peculiarly adapted for use in the aircraft applications indicated above. Thus, such valve means may be used as an engine starting valve for controlling the flow of air into an engine being started and for preventing the escape of air from the engine after it has been started. Also, such valve means may be used for controlling the flow of engine bleed air to the environmental control system and for automatically checking the flow of air from the system to the engine.

It is another object of my present invention to provide valve means, as described, wherein shut-off valve means and check valve means are incorporated in a single assembly and integrally mounted within a common housing.

It is another object of my present invention to provide a combined shut-off and check valve assembly, as described, wherein the shut-off valve means includes a valve piston unit which is normally maintained in valve closing position and which is movable to valve opening position when a pressure differential is selectively established between the interior and exterior thereof.

It is a further object of my present invention to provide a combined shut-off and check valve assembly, as described, wherein the elements of the check valve means are so arranged that sensitivity of fluctuations in fluid flow and pressure, and consequent flutter and oscillation, are eliminated.

It is a further object of my present invention to provide a combined shut-off and check valve assembly, as described, wherein the elements of the check valve means are so contoured that resistance to the smooth flow of fluid in the normal flow direction, and resultant pressure loss through the valve assembly, are minimized.

It is a further object of my present invention to provide a combined shut-off and check valve assembly, as described, wherein the elements of the inlet and outlet flanges that serve as valve seats are so contoured that resistance to the smooth flow of fluid in the normal flow direction, and resultant pressure loss through the valve assembly, are minimized.

It is a still further object of my present invention to provide a combined shut-off and check valve assembly, as described, wherein the overall size and weight thereof are maintained at a minimum, consistant with the extremes of pressure and temperature encountered in military and commercial aircraft.

Now in order to acquaint those skilled in the art with the manner of constructing and using valve assemblies in accordance with the principles of my present invention, I shall describe in connection with the accompanying drawing a preferred embodiment of my invention.

In the drawing:

FIGURE 1 is a side elevational view of a preferred embodiment of combined shut-off and check valve assembly incorporating the principles of my present invention;

FIGURE 2 is an end elevational view of the valve assembly of FIGURE 1, with portions being broken away to illustrate the interior thereof; and FIGURE 3 is a vertical longitudinal sectional view, on an enlarged scale, taken substantially along the line 3—3 in FIGURE 2, looking in the direction indicated by the arrows.

Referring now to the drawing, there is indicated generally by the reference numeral 10 a preferred embodiment of combined inline shut-off and check valve assembly incorporating the principles of my present invention. For convenience of discussion, the right-hand end of the valve assembly 10, as viewed in FIGURES 1 and 3, will be considered the upstream end, and the left-hand end will be considered the downstream end.

The valve assembly 10 comprises a housing, indicated generally by the reference numeral 12, which includes an intermediate body section 14 in the form of transverse wall means as shown in FIGURE 3. The body section 14 is provided with an outer rim portion 16 having axially spaced interior annular recesses 18 and 20, a plurality of circumferentially spaced axially directed openings 22 immediately radially inwardly of the rim portion 16, and a cylinder portion 24 extending axially in a downstream direction. The body section 14 is also provided with an annular shoulder 25 generally opposite the cylinder portion 24, and central axial tubular portions 26 and 28 projecting respectively upstream and downstream and having a common axial bore 30 therethrough. The outer end of the tubular portion 26 is closed as at 31.

The housing 12 further comprises a pair of thin-walled body sections 32 and 34. The inner ends of the body sections 32 and 34 are suitably secured, respectively, in the recesses 18 and 20 provided in the rim portion 16 of the intermediate body section 14. The outer ends of the body sections 32 and 34 are curved radially inwardly and terminate, respectively, in annular collar portions 36 and 38. Suitably secured within the collar portions 36 and 38, respectively, are ring members 40 and 42 which, in turn, have mounted thereto the inner ends of generally annular mounting flange members 44 and 45 that serve to define axially aligned inlet and outlet openings 46 and 47. The inner faces of the flange members 44 and 45 are bevelled, respectively as at 48 and 50, to define valve seats at the inlet and outlet openings 46 and 47 for a purpose to be presently described. Additionally, the inner surfaces of the flange members 44 and 45 are so contoured that resistance to the smooth flow of fluid in the normal flow mode, and resultant pressure loss through the valve assembly, are minimized.

Disposed within the housing 12 are an upstream check valve piston unit, indicated generally by the reference numeral 52, and an inline downstream shut-off valve piston unit, indicated generally by the reference numeral 54.

The check valve piston unit 52 is comprised of a sleeve member 56 slidably mounted on the tubular portion 26 of the intermediate body section 14. The outer end of the sleeve member 56 is formed with a closed radially enlarged nose portion 58 to which is secured the central portion of a hollow cup-shaped thin-walled closure member or check valve piston 60 having the side walls thereof disposed to extend axially toward the intermediate body section 14. Interposed between the intermediate body section 14 and the piston 60, concentrically about the sleeve member 56, is a compression coil spring 62. The spring 62 serves to normally urge the piston 60 into seating engagement with the valve seat 48, as shown in solid lines in FIGURE 3, to close the inlet opening 46. The piston 60 is movable to an open position in response to fluid flow and pressure at the inlet opening. When the piston 60 is in the fully open position shown in dotted lines in FIGURE 3, the rear edge thereof engages the shoulder 25 on the intermediate body section 14. It is to be appreciated that the elements of the check valve piston unit 52 are so contoured that resistance to the smooth flow of fluid in the normal flow mode, and resultant pressure loss through the valve assembly, are maintained at a minimum.

The shut-off valve piston unit 54 is comprised of a generally cylindrical hollow body portion 63 having a closed end wall 64 which serves to define a valve closure portion or valve disc and which has a central aperture 66 formed therein. Projecting through the aperture 66 in the end wall 64 is the outer end of a rod member 68 that is slidably mounted in the bore 30 of the tubular portions 26 and 28 of the intermediate body section 14. The end wall or valve disc 64 is secured on the rod member 68 in abutment with an annular collar portion 70 thereof by means of a spacer 72 and a self-locking nut 74 threaded onto the end of the rod member 68. The cylindrical body portion 63, adjacent its open end, is provided with axially spaced exterior flange portions 75, which number three in the specific embodiment herein disclosed. The flange 75 closest to the open end of the cylinder portion 24 serves as an effective piston portion of the valve unit 54 for a purpose to be hereinafter described. Alternating with the flanges 75 are piston rings 76 that frictionally engage the inner cylindrical surface of the cylinder portion 24 of the intermediate body section 14. The cylindrical body portion 63 is also formed with a small bleed orifice 77. Interposed between the intermediate body section 14 and the valve disc 64 is a compression coil spring 78 which serves to normally urge the cylindrical body 63 to the position shown in solid lines in FIGURE 3 with the valve disc 64 being disposed in seating engagement with the valve seat 50 to close the outlet opening 47. When the valve disc 64 is in fully open position, as shown in dotted lines, the rear edge of the cylindrical body 63 abuts the adjacent surface of the intermediate body section 14.

I shall now describe the means for controlling opening and closing movement of the shut-off valve piston unit 54. Formed integrally with the rim portion 16 of the intermediate body section 14, exteriorly of the housing 12, is an extension portion or member 80. The extension member 80 is provided with a horizontal bore 82 which communicates with the interior of the cylinder 24 of the intermediate body section 14 through a horizontal passageway 84 and a vertical passageway 86. Mounted to the extension member 80 and projecting into the bore 82 is a solenoid operated ball valve assembly indicated generally by the reference numeral 87.

The assembly 87 is comprised of a generally cylindrical fitting 88 that is disposed in the bore 82. The fitting 88 has a radial wall 90 with an aperture 92 therein which serves to define at its inner marginal edge a valve seat 94, and has a radial flange portion 96 that is suitably secured to the outer face of the extension member 80. The assembly 87 further comprises a solenoid unit including a casing 100, an outer end cap 102, and an inner end disc 104 secured, in axially spaced relation, to the fitting flange 96. Arranged within the casing 100 is a solenoid coil 106, a core member 108, and a plunger support member 110. Slidably mounted in the support member 110 is a plunger 112 from the end of which axially extends a rod 114. Suitable apertures are formed in the core member 108 and the disc 104 to accommodate projection of the rod 114 therethrough. Secured to the end of the rod 114 opposite the plunger 112 are a ball valve 116 having radial fins 117, and a guide sleeve 118 slidably mounted in the cylindrical fitting 88. Interposed between a recess in the wall 90 of the fitting 88 and the fins 117 of the ball valve 116 is a compression coil spring 120 which serves to normally bias the ball valve 116 away from seating engagement with the valve seat 94.

When the ball valve 116 is unseated from the valve seat 94, the interior of the shut-off valve piston unit 54 communicates with the atmosphere through the passageways 84 and 86, the fitting aperture 92, the annular space intermediate of the rod 114 and guide sleeve 118, and the space between the fitting flange 96 and solenoid disc 104. When the ball valve 116 is engaged with the valve seat 94, the interior of the shut-off valve piston unit 54 is closed to the atmosphere. Closing and opening of the ball valve 116 is effected by energization and deenergization of the solenoid coil 106. The solenoid operated ball valve assembly 87 may be mounted directly to the extension member 80 as shown, or may be remotely mounted, if desired, and connected thereto through suitable tubing or the like. When the assembly 87 is mounted as shown, a plate member 122 is provided to shield the assembly 87 from heat emitted by the valve assembly 10.

The above-described combined shut-off and check valve assembly of my present invention is especially adapted for use in various aircraft applications. The valve assembly may be interposed in duct work arranged to convey fluid, such as bleed air, from an aircraft engine to an associated environmental control system, or from an external source or similar operating engine to an aircraft engine for the purpose of impingement starting, and to prevent the flow of fluid in a direction opposite to the normal flow mode. More specifically, the flange member 44 is adapted to be mounted to an upstream duct connected with an aircraft engine or similar external source and the flange member 45 is adapted to be mounted to a downstream duct connected to an environmental control system or aircraft engine to be started. In either installation, when the solenoid coil 106 is deenergized, the coil spring 120 biases the ball valve 116 away from seating engagement with the valve seat 94, as shown in FIGURE 3, and the interior of the shut-off valve piston unit 54 is maintained open to the atmosphere in the manner previously described. At the same time, when there is no flow of fluid through the valve assembly in the normal flow mode, the coil spring 62 will bias the check valve piston 60 into seating engagement with the valve seat 48 as shown in solid lines in FIGURE 3, and the coil spring 78 will bias the valve disc 64 into engagement with the valve seat 50 as shown in solid lines in FIGURE 3. Thus, in the absence of fluid flow, both the inlet opening 46 and the outlet opening 47 are maintained closed.

Normally, when fluid is to flow through the valve assembly in the normal flow mode, the solenoid coil 106 is electrically energized causing the plunger 112 and the rod 114 to move axially to the left, as viewed in FIGURE 3, thereby disposing the ball valve 116 into seating engagement with the valve seat 94 for closing the passageways 84 and 86 and the interior of the shut-off valve piston unit 54 to the atmosphere. When the pressure of the air delivered at the inlet opening 46 exceeds the pressure of the fluid within the housing 12, the check valve piston 60 is automatically moved axially from the solid line position to the dotted line position shown in FIGURE 3. Although the check valve piston 60 is spring biased to a closed position, it will open fully at less than 3 p.s.i. pressure differential. It is to be observed that when the check valve piston 60 is in a fully open position the rear edge thereof engages the shoulder 25 on the intermediate body section 14. By reason of this arrangement, sensitivity of the check valve piston 60 to fluctuations in fluid flow and pressure, and consequent flutter and oscillation thereof, are eliminated.

Fluid under pressure entering the open inlet opening 46 flows past the check valve piston 60, through the axial openings 22 in the intermediate body section 14 and to the area surrounding the shut-off valve piston unit 54. The fluid then flows through the bleed orifice 77 and leaks past the piston rings 76 into the interior of the shut-off valve piston unit 54. So long as the ball valve 116 is engaged with the adjacent valve seat 94, and the passageways 84 and 86 thus closed to the atmosphere, the shut-off valve piston unit 54 will remain closed. The valve unit 54 is held closed by a force equal to the force of the spring 78, plus the pressure of the fluid within the valve unit 54 times the area of the valve disc 64.

The shut-off valve piston unit 54 may be opened by deenergizing the solenoid coil 106 which permits the coil spring 120 to unseat the ball valve 116. Upon unseating of the ball valve 116, the passageways 84 and 86, and the interior of the shut-off valve piston unit 54, are opened to the atmosphere. As a result, the pressure within the valve unit 54 is greatly reduced, since the rate of flow of fluid under pressure through the bleed orifice 77 and past the piston rings 76 is small relative to the rate of flow of fluid from the interior of the valve unit 54 through the passageways 84 and 86 to the atmosphere. A pressure differential is thus established between the interior and exterior of the valve unit 54. The initial opening force, which primarily acts on the effective piston portion of the valve unit 54, is equal to the difference in area between the inside diameter of the cylinder portion 24 and the diamter of contact between the disc 64 and the seat 50, times the pressure of the fluid within the housing 12 received from the upstream duct, less the relatively small force exerted by the spring 78. As the shut-off valve piston unit 54 starts to move inwardly of the cylinder portion 24 of the intermediate body section 14, the valve disc 64 is disengaged from the valve seat 50 thereby permitting flow of fluid from the housing 12 through the outlet opening 47 to the downstream duct. After the valve unit 54 has initially opened, the opening force acting thereon increases to a value essentially equal to the pressure of the fluid in the downstream duct times the entire area of the inside diameter of the cylinder portion 24, since the downstream duct pressure is increasing to a value substantially equal to the upstream duct pressure, while the pressure prevailing interiorly of the valve unit 54 remains practically equal to atmospheric pressure. When the valve unit 54 has been fully opened to the position shown in dotted lines in FIGURE 3, it will remain in this position so long as the ball valve 116 is unseated from the adjacent valve seat 94 and the interior of the valve unit 54 is open to the atmosphere.

The shut-off valve piston unit 54 may again be closed by energizing the solenoid coil 106 which causes the ball valve 116 to engage the valve seat 94 thereby closing the interior of the valve unit 54 to the atmosphere. Under this condition, fluid under pressure flowing through the bleed orifice 77 and past the piston rings 76 will build up the pressure within the valve unit 54 until the pressures interiorly and exteriorly of the valve unit 54 are substantially equalized. Then the spring 78 will move the valve unit 54 to its closed position with the valve disc 64 being disposed into engagement with the valve seat 50. Whenever the pressure of the fluid in the upstream duct leading from the source of fluid decreases to substantially atmospheric pressure, the spring 62 will cause the check valve piston 60 to move to a closed position in engagement with the valve seat 48 thereby automatically preventing the back flow of fluid from the downstream duct should the shut-off valve piston unit 54 be open.

From the foregoing description, it will be appreciated that I have provided a combined shut-off and check valve assembly, wherein the shut-off valve means and the check valve means are incorporated in a single assembly and integrally mounted within a common housing, for controlling the flow of fluid in the normal flow mode and for automatically checking the reverse flow of fluid. By reason of the compact arrangement of the elements of the valve assembly of my present invention, the overall size and weight of the assembly are maintained at a minimum. Operationally, in the event of electrical power failure, the valve unit 54 is conditioned to remain open whenever fluid under pressure is flowing through the housing 12. As explained, when the solenoid coil 106 is deenergized, the spring 120 serves to unseat the ball valve 116 thereby maintaining the interior of the shut-off valve piston unit 54 open to the atmosphere. Correspondingly, if there is loss of fluid pressure from the passageways 84 and 86 past the bore 82, the shut-off valve piston unit 54 will open and remain open if the fluid under pressure is flowing through the housing 12. On the other hand, if there is loss of pressure of fluid flowing from the source of fluid, the check valve piston 60 will close. To accommodate an alternative failure mode when deemed desirable for a particular system in which the valve assembly is used, the solenoid operated ball valve assembly 87 may be conditioned to close, rather than open, in the event of electrical power failure.

While I have shown and described what I believe to be a preferred embodiment of my present invention, it will be understood by those skilled in the art that various rearrangements and modifications may be made therein without departing from the spirit and scope of my invention.

I claim:

1. A combined inline shut-off and check valve assembly comprising, a housing having axially aligned inlet and outlet openings and intermediate transverse wall means, a first valve seat at said inlet opening and a second valve seat at said outlet opening, said intermediate transverse wall means having a tubular portion and a concentric annular shoulder portion, a sleeve member slidably mounted on said tubular portion, a hollow check valve piston at the end of said sleeve member, means interposed between said intermediate transverse wall means and said check valve piston for normally biasing the latter into engagement with said first valve seat, said check valve piston being disengageable from said first valve seat when the pressure of fluid at said inlet opening is greater than the pressure of fluid within said housing to permit flow of fluid through said inlet opening into said housing, said check valve piston when disengaged from said valve seat being seatable against said shoulder portion of said transverse wall means whereby to eliminate flutter and oscillation of said check valve piston during flow of fluid through said inlet opening into said housing, said intermediate transverse wall means having a cylinder portion, shut-off valve piston means being slidable in said cylinder portion of said intermediate transverse wall means, said shut-off valve piston means having a valve closure portion engageable with said second valve seat to prevent flow of fluid from said housing through said outlet opening and having an effective piston portion, means for selectively opening the interior of said cylinder portion to the atmosphere for reducing the pressure of fluid within said shut-off valve piston means whereupon the pressure of fluid within said housing exteriorly of said shut-off valve piston means initially exerts a force primarily against said effective piston portion causing said shut-off valve piston means to move inwardly of said cylinder portion of said intermediate transverse wall means and said valve closure portion to be disengaged from said second valve seat to permit flow of fluid through said outlet.

2. A combined shut-off and check valve assembly comprising, a housing having inlet and outlet openings and intermediate transverse wall means, a first valve seat at said inlet opening, check valve means in said housing being engageable with said first valve seat to prevent flow of fluid from said housing through said inlet opening and being disengageable from said first valve seat to permit flow of fluid under pressure through said inlet opening into said housing, a second valve seat at said outlet opening, said intermediate transverse wall means having a tubular portion and a concentric cylinder portion both extending axially toward said outlet opening, a rod member slidable in said tubular portion of said intermediate transverse wall means and projecting axially outwardly thereof in the direction of said outlet opening, shut-off valve piston means having a hollow cylindrical body portion with one end being closed for defining a valve disc, said valve disc being secured to the end of said rod member, said cylindrical body portion of said shut-off valve piston means having at least one exterior annular piston flange adjacent the open end thereof and slidable in said cylinder portion of said intermediate transverse wall means, means interposed between said intermediate transverse wall means and said valve disc for normally biasing the latter into engagement with said second valve seat to prevent flow of fluid from said housing through said outlet opening, and means for selectively opening the interior of said cylinder portion of said intermediate transverse wall means to the atmosphere for reducing the pressure of fluid within said shut-off valve piston means whereupon the pressure of fluid within said housing exteriorly of said shut-off valve piston means initially exerts a force primarily against said piston flange causing said shut-off valve piston means to move inwardly of said cylinder portion of said intermediate transverse wall means and said valve disc to be disengaged from said second valve seat to permit flow of fluid through said outlet opening.

3. A combined shut-off and check valve assembly comprising, a housing having inlet and outlet openings and intermediate transverse wall means, a first valve seat at said inlet opening and a second valve seat at said outlet opening, said intermediate transverse wall means having a tubular portion, a sleeve member slidably mounted on said tubular portion, a check valve piston at the end of said sleeve member, means interposed between said intermediate transverse wall means and said check valve piston for normally biasing the latter into engagement with said first valve seat, said check valve piston being disengageable from said first valve seat when the pressure of fluid at said inlet opening is greater than the pressure of fluid within said housing to permit flow of fluid through said inlet opening into said housing, said intermediate transverse wall means having a cylinder portion, shut-off valve piston means having a hollow cylindrical body portion with one end being closed for defining a valve disc, said cylindrical body portion of said shut-off valve piston means having at least one exterior annular piston flange slidable in said cylinder portion of said intermediate transverse wall means, means interposed between said intermediate transverse wall means and said valve disc for normally biasing the latter into engagement with said second valve seat to prevent flow of fluid from said housing through said outlet opening, said intermediate transverse wall means having passageway means therein communicating at one end thereof with the interior of said cylinder portion, means for selectively opening and closing the other end of said passageway means to the atmosphere, and said passageway means when open to the atmosphere serving to reduce the pressure of fluid within said shut-off valve piston means whereupon the pressure of fluid within said housing exteriorly of said shut-off valve piston means initially exerts a force primarily against said piston flange causing said shut-off valve piston means to move inwardly of said cylinder portion of said intermediate transverse wall means and said valve disc to be disengaged from said second valve seat to permit flow of fluid through said outlet opening.

4. A combined inline shut-off and check valve assembly comprising, a housing having axially aligned inlet and outlet openings and intermediate transverse wall means, a first valve seat at said inlet opening and a second valve seat at said outlet opening, said intermediate transverse wall means having a first tubular portion extending axially toward said inlet opening, a sleeve member slidably mounted on said first tubular portion, a check valve piston at the end of said sleeve member, spring means interposed between said intermediate transverse wall means and said check valve piston for normally biasing the latter into engagement with said first valve seat, said check valve piston being disengageable from said first valve seat when the pressure of fluid at said inlet opening is greater than the pressure of fluid within said housing to permit flow of fluid through said inlet opening into said housing, said intermediate transverse wall means having a second tubular portion and a concentric cylinder portion both extending axially toward said outlet opening, a rod member axially slidable in said second tubular portion of said intermediate transverse wall means and projecting axially outwardly thereof in the direction of said outlet opening, shut-off valve piston means having a hollow cylindrical body portion with one end being closed for defining a valve disc, said valve disc being secured to the end of said rod member, said cylindrical body portion of said shut-off valve piston means having at least one exterior annular piston flange adjacent the open end thereof and slidable in said cylinder portion of said intermediate transverse wall means, spring means interposed between said intermediate transverse wall means and said valve disc for normally biasing the latter into engagement with said second valve seat to prevent flow of fluid from said housing through said outlet opening, said intermediate transverse wall means having an extension portion exteriorly of said housing with a bore therein, said intermediate transverse wall means having passageway means therein interconnecting said bore and the interior of said cylinder portion, means mounted on said extension portion and projecting into said bore thereof for selectively opening and closing said passageway means to the atmosphere, and said passageway means when opened to the atmosphere serving to reduce the pressure of fluid within said shut-off valve piston means whereupon the pressure of fluid within said housing exteriorly of said shut-off valve piston means initially exerts a force primarily against said piston flange causing said shut-off valve piston means to move inwardly of said cylinder portion of said intermediate transverse wall means and said valve disc to be disengaged from said second valve seat to permit flow of fluid through said outlet opening.

5. A combined inline shut-off and check valve assembly comprising, a housing having axially aligned inlet and outlet openings and intermediate transverse wall means, a first valve seat at said inlet opening and a second valve seat at said outlet opening, said intermediate transverse wall means having a first tubular portion extending axially toward said inlet opening, a sleeve member slidably mounted on said first tubular portion, a check valve piston at the end of said sleeve member, means interposed between said intermediate transverse wall means and said check valve piston for normally biasing the latter into engagement with said first valve seat, said check valve piston being disengageable from said first valve seat when the pressure of fluid at said inlet opening is greater than the pressure of fluid within said housing to permit flow of fluid through said inlet opening into said housing, said intermediate transverse wall means having a second tubular portion and a concentric cylinder portion both extending axially toward said outlet opening, a rod member axially slidable in said second tubular portion of said intermediate transverse wall means and projecting axially outwardly thereof in the direction of said outlet opening, shut-off valve piston means having a hollow cylindrical body portion with one end being closed for defining a valve disc, said valve disc being secured to the end of said rod member, said cylindrical body portion of said shut-off valve piston means having at least one exterior annular piston flange adjacent the open end thereof and slidable in said cylinder portion of said intermediate transverse wall means, means interposed between said intermediate transverse wall means and said valve disc for normally biasing the latter into engagement with said second valve seat to prevent flow of fluid from said housing through said outlet opening, said intermediate transverse wall means having an extension portion exteriorly of said housing with a bore therein, said intermediate transverse wall means having passageway means therein interconnecting said bore and the interior of said cylinder portion, said bore being provided with a valve seat, a ball valve engageable with said bore valve seat, solenoid means mounted on said extension portion, a rod at one end being axially slidably in said solenoid means and at the other end having connection with said ball valve whereby the latter is engaged with and disengaged from said bore valve seat and said passageway means is closed and opened to the atmosphere by selective energization and deenergization of said solenoid means, and said passageway means when open to the atmosphere serving to reduce the pressure of fluid within said shut-off valve piston means whereupon the pressure of fluid within said housing exteriorly of said shut-off valve piston means initially exerts a force primarily against said piston flange causing said shut-off valve piston means to move inwardly of said cylinder portion of said intermediate transverse wall means and said valve disc to be disengaged from said second valve seat to permit flow of fluid through said outlet opening.

References Cited by the Examiner

UNITED STATES PATENTS

| | | | |
|---|---|---|---|
| 2,085,893 | 7/1937 | Boland | 251—44 X |
| 2,943,636 | 7/1960 | Reed et al. | 137—220 |
| 3,155,108 | 11/1964 | Kahn et al. | 137—614.21 X |
| 3,172,420 | 3/1965 | Brown et al. | 137—219 |

FOREIGN PATENTS 430,241   8/1911   France.

M. CARY NELSON, *Primary Examiner.*

ARNOLD ROSENTHAL, *Examiner.*